(12) United States Patent
Sishtla et al.

(10) Patent No.: US 12,394,325 B2
(45) Date of Patent: Aug. 19, 2025

(54) OPTIMIZED WEATHER AND THREAT DEPICTION BASED ON AIRCRAFT FLIGHT PLAN

(71) Applicant: Rockwell Collins, Inc., Cedar Rapids, IA (US)

(72) Inventors: Venkata A. Sishtla, Cedar Rapids, IA (US); Jacob G. Teague, West Melbourne, FL (US); Krystina Rodriguez, West Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 269 days.

(21) Appl. No.: 17/571,277

(22) Filed: Jan. 7, 2022

(65) Prior Publication Data
US 2023/0222922 A1  Jul. 13, 2023

(51) Int. Cl.
*G08G 5/76* (2025.01)
*G01S 13/95* (2006.01)
*G08G 5/52* (2025.01)
*G08G 5/53* (2025.01)
*G08G 5/55* (2025.01)
*G08G 5/59* (2025.01)
*G06T 11/20* (2006.01)

(52) U.S. Cl.
CPC .............. *G08G 5/76* (2025.01); *G01S 13/953* (2013.01); *G01S 13/955* (2013.01); *G08G 5/52* (2025.01); *G08G 5/53* (2025.01); *G08G 5/55* (2025.01); *G08G 5/59* (2025.01); *G06T 11/206* (2013.01)

(58) Field of Classification Search
CPC .... G08G 5/0091; G08G 5/0052; G08G 5/006; G08G 5/0065; G01S 13/953; G01S 13/955; G06T 11/206
See application file for complete search history.

(56) References Cited

U.S. PATENT DOCUMENTS

| | | | | |
|---|---|---|---|---|
| 6,388,608 B1 * | 5/2002 | Woodell | .................. | G01S 13/95 342/75 |
| 6,424,288 B1 * | 7/2002 | Woodell | ................ | G01S 13/953 342/158 |
| 6,603,425 B1 * | 8/2003 | Woodell | .................. | G01S 7/414 342/75 |

(Continued)

FOREIGN PATENT DOCUMENTS

EP  2966467 A1  1/2016

OTHER PUBLICATIONS

Extended European Search Report dated Jun. 1, 2023; European Application No. 23150306.1.

*Primary Examiner* — Justin R. Blaufeld
(74) *Attorney, Agent, or Firm* — Suiter Swantz IP (57) ABSTRACT

A weather depiction system for an aircraft is disclosed. A radar is configured to scan a surrounding environment of the aircraft and provide weather data. An aircraft computing device is configured to: detect weather patterns using the weather data, receive a flight trajectory of the aircraft from a flight management system (FMS), compare the flight trajectory to an altitude of each of the weather patterns, identify the weather pattern as relevant or non-relevant based on the comparison, and present symbols corresponding to the relevant weather patterns on the weather display and exclude symbols corresponding to the non-relevant weather patterns on the weather display.

15 Claims, 6 Drawing Sheets

(56) References Cited

U.S. PATENT DOCUMENTS

| | | | |
|---|---|---|---|
| 7,417,579 B1* | 8/2008 | Woodell | G01S 7/41 |
| | | | 342/75 |
| 7,427,943 B1 | 9/2008 | Kronfeld et al. | |
| 7,889,117 B1 | 2/2011 | Woodell et al. | |
| 8,077,078 B1 | 12/2011 | Woodell et al. | |
| 8,643,533 B1 | 2/2014 | Woodell et al. | |
| 8,977,491 B1 | 3/2015 | McCusker et al. | |
| 9,024,805 B1 | 5/2015 | Jinkins et al. | |
| 9,244,167 B1 | 1/2016 | Oransky et al. | |
| 9,297,896 B1* | 3/2016 | Andrews | H01Q 3/30 |
| 9,562,788 B1 | 2/2017 | Jinkins et al. | |
| 9,952,310 B2 | 4/2018 | Wang et al. | |
| 10,494,108 B1* | 12/2019 | Finley | B64D 43/00 |
| 10,605,912 B1 | 3/2020 | Godfrey et al. | |
| 2008/0165051 A1* | 7/2008 | Khatwa | G01S 13/953 |
| | | | 342/26 B |
| 2013/0006450 A1* | 1/2013 | Del Amo Blanco | G08G 5/32 |
| | | | 701/14 |
| 2016/0011741 A1* | 1/2016 | Khatwa | G08G 5/21 |
| | | | 715/765 |
| 2019/0114931 A1* | 4/2019 | De Villele | G08G 5/21 |
| 2021/0247513 A1 | 8/2021 | Song et al. | |

* cited by examiner

OPTIMIZED WEATHER AND THREAT DEPICTION BASED ON AIRCRAFT FLIGHT PLAN

BACKGROUND

Weather radars display relevant weather to the flight deck, and exclude weather significantly below the altitude of the aircraft. While planning for an ascent or descent, however, low-lying weather becomes relevant to the aircraft (especially at longer ranges). Currently, weather radars exclude the low-lying weather, which may result in the display of an abrupt weather warning during the descent. This abrupt warning may lead to unexpected deviations in the flight path. To make better flight decisions, it may be desirable to solve the problems described above.

SUMMARY

A weather depiction system for an aircraft is disclosed in accordance with one or more illustrative embodiments of the present disclosure. In one illustrative embodiment, the system comprises a radar configured to scan a surrounding environment of the aircraft and provide weather data. In another illustrative embodiment, the system comprises an aircraft computing device including one or more processors configured to execute program instructions causing the one or more processors to: detect one or more weather patterns using the weather data, wherein each of the one or more weather patterns is detected at a detected altitude; receive a flight trajectory of the aircraft from a flight management system (FMS); for each of the one of more weather patterns, compare the flight trajectory to the detected altitude of each of the one or more weather patterns, and, responsive to the detected altitude being within a threshold distance in elevation from the flight trajectory, identify the weather pattern as one of a plurality of relevant weather patterns, or, responsive to the detected altitude being outside a threshold distance in elevation from the flight trajectory, identify the weather pattern as one of a plurality of non-relevant weather patterns; and, present symbols corresponding to the relevant weather patterns on a weather display and exclude symbols corresponding to the non-relevant weather patterns on the weather display.

A weather depiction method for an aircraft is disclosed in accordance with one or more illustrative embodiments of the present disclosure. In one illustrative embodiment, the method comprises scanning, using a radar, a surrounding environment of the aircraft and providing weather data; detecting one or more weather patterns using the weather data, wherein each of the one or more weather patterns is detected at a detected altitude; using an aircraft computing device, receiving a flight trajectory of the aircraft from a flight management system (FMS); comparing, for each of the one of more weather patterns, the flight trajectory to the detected altitude of each of the one or more weather patterns; responsive to the detected altitude being within a threshold distance in elevation from the flight trajectory, identifying the weather pattern as one of a plurality of relevant weather patterns, or, responsive to the detected altitude being outside a threshold distance in elevation from the flight trajectory, identifying the weather pattern as one of a plurality of non-relevant weather patterns; and presenting symbols corresponding to the relevant weather patterns on a weather display and excluding symbols corresponding to the non-relevant weather patterns on the weather display.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which:

FIGS. 2A-3B are conceptual images illustrating the presentation of weather patterns on a flight display, in accordance with one or more embodiments of the present disclosure.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of embodiments of the present inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

Weather radars display relevant weather to the flight deck, and exclude weather significantly below the altitude of the aircraft. An example of such a weather radar is the Multi-Scan™ Weather Radar developed by Collins Aerospace (Cedar Rapids, IA). While planning for an ascent or descent, however, low-lying weather becomes relevant to the aircraft (especially at longer ranges). Currently, weather radars exclude the low-lying weather, which may result in the display of an abrupt weather warning during the descent. This abrupt warning may lead to unexpected deviations in the flight path. To make better flight decisions, it may be desirable to solve the problems described above.

Embodiments of the present disclosure are directed to a weather depiction system and method for an aircraft. Using flight plan inputs (i.e., a flight trajectory) from a flight management system (FMS), the weather radar may adapt its processing to improve the detection of threats (e.g., weather patterns or air traffic) relevant to the aircraft for each phase of flight. Relevant threats may be presented on a flight display, and non-relevant threats may be excluded from the flight display. When the flight trajectory indicates a cruising mode, the weather radar processing may be unchanged, and may continue to exclude or deprioritize non-relevant threats. However, if the flight trajectory indicates a descent mode or an ascent mode, the weather radar may present threats relevant to the aircraft based on its trajectory even before the aircraft reaches the top of descent (or the bottom of ascent). The weather radar may choose a different display threshold or may use a different scan strategy to improve the detection of the relevant weather. In some embodiments, beam sharpening provided by an electronically scanned array (ESA) using a monopulse technique (or other techniques such as a split aperture technique or a conical scan technique) may further improve the estimation of altitudes of weather patterns. Displaying weather patterns based on phase of flight may enhance flight safety by enabling earlier decision making, and thus may increase pilot confidence.

Figure 1:
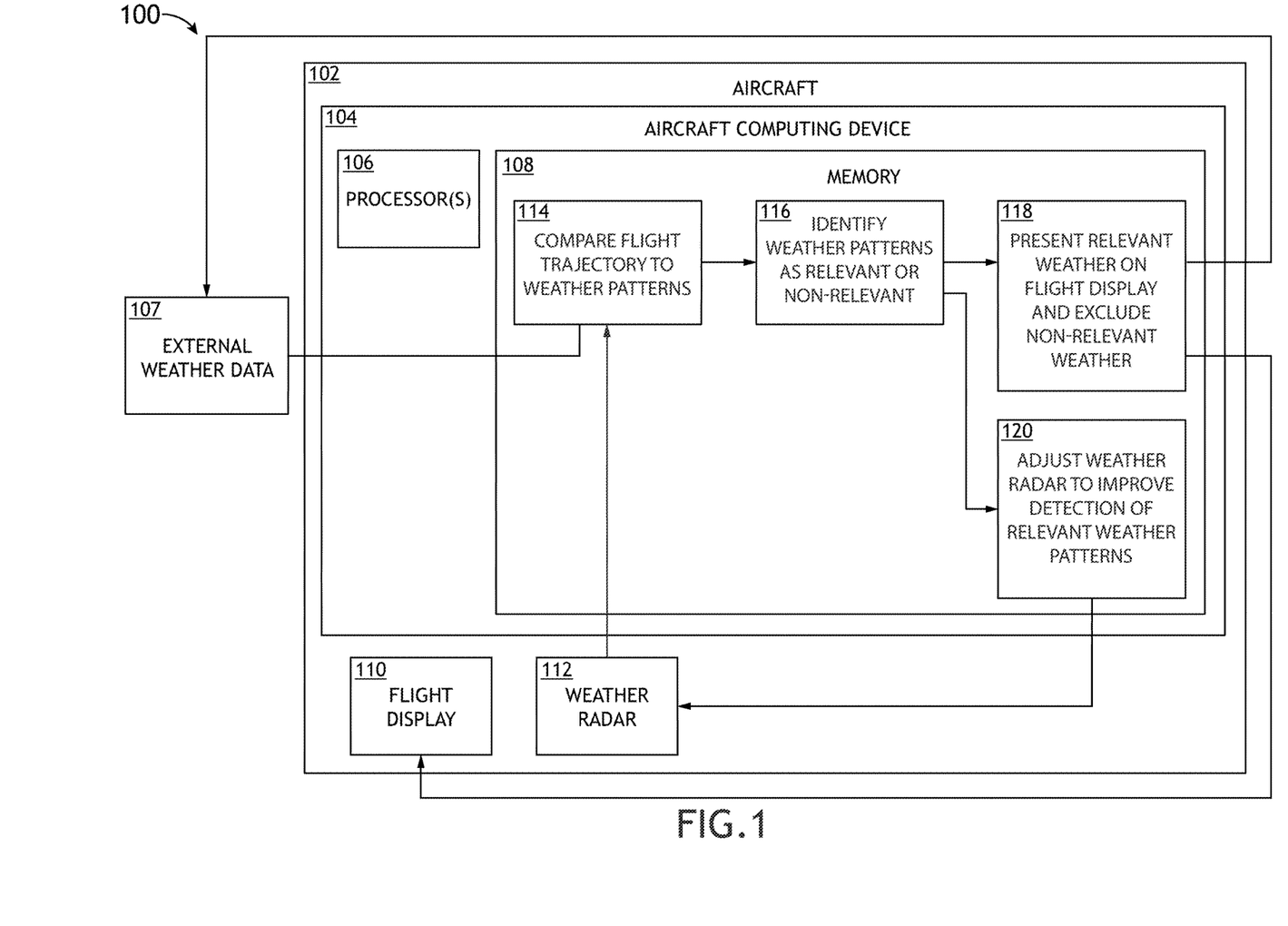
FIG. 1 is a schematic diagram illustrating a weather depiction system for an aircraft, in accordance with one or more embodiments of the present disclosure.

FIG. 1 is a schematic diagram illustrating an aircraft weather depiction system 100, in accordance with one or more embodiments of the present disclosure. The system 100 comprises an aircraft 102, an aircraft computing device 104, flight display(s) 110, and a radar 112.

The aircraft 102 may be a fixed wing or rotary vehicle, and may be a civilian, commercial, or military vehicle. The aircraft 102 may be jet engine-based or propeller engine based aircraft, and may be capable of flying at an altitude of from 0 to over 50,000 feet. For example, the aircraft 102 may be a turboprop aircraft, a piston aircraft, a jet aircraft, a light jet aircraft, a mid-size jet aircraft, a jumbo jet aircraft, a regional jet aircraft, a narrow body aircraft, a wide body airliner air, a regional aircraft, a short-haul aircraft, a commuter liner aircraft, a fighter aircraft, a bomber aircraft, a water bomber aircraft, a multi-role combat aircraft, a maritime patrol aircraft, and/or a transport aircraft.

The aircraft computing device 104 may be a controller (e.g., computer) including one or more processors 106 and a memory 108. For the purposes of the present disclosure, the term "processor" or "processing element" may be broadly defined to encompass any device having one or more processing or logic elements, for example, one or more central processing units (CPUs), one or more graphics processing units (GPUs), one or more micro-processor devices, one or more application specific integrated circuit (ASIC) devices, one or more field programmable gate arrays (FPGAs), or one or more digital signal processors (DSPs), etc. In this sense, the one or more processors 106 may include any device configured to execute algorithms and/or instructions (e.g., program instructions stored in memory), and may be configured to perform the method steps described in the present disclosure (for example, the method steps described with respect to FIG. 4). The memory 108 may include any storage medium known in the art suitable for storing program instructions executable by the associated processors 106. For example, the memory 108 may include, but is not limited to, a read-only memory (ROM), a random-access memory (RAM), a magnetic or optical memory device (e.g., hard disk), a magnetic tape, a solid-state drive, and the like. In some embodiments, the radar 112 may include the memory 108, or may be communicatively coupled to the memory 108.

The aircraft computing device(s) 104 may comprise one or more avionics embedded systems (e.g., an avionics suite), and may include a flight management system (FMS) computing device, a communications computing device, a navigation computing device, a flight display computing device, a flight control computing device, a fuel management computing device, a collision-avoidance computing device, a weather computing device, etc. In some embodiments, an FMS computing device may provide a flight trajectory of the aircraft 102. The flight trajectory may comprise 4D trajectory information including altitude, longitude, latitude, time, and speed for one or more flight legs between two or more waypoints.

The flight displays 110 may be implemented using any of a variety of display technologies, including CRT, LCD, organic LED, dot matrix display, and others. The flight displays 110 may be navigation (NAV) displays, primary flight displays, electronic flight bag displays, tablets such as iPad® computers manufactured by Apple, Inc. or tablet computers, synthetic vision system displays, head up displays (HUDs) with or without a projector, wearable displays, etc. The flight displays 110 may be used to provide information to the flight crew, thereby increasing visual range and enhancing decision-making abilities. One or more of the flight displays 110 may be configured to function as, for example, a primary flight display (PFD) used to display altitude, airspeed, vertical speed, navigation and traffic collision avoidance system (TCAS) advisories. One or more of the flight displays 110 may also be configured to function as, for example, a multi-function display used to display navigation maps, weather radar, electronic charts, TCAS traffic, aircraft maintenance data and electronic checklists, manuals, and procedures. According to an exemplary embodiment, at least one of the flight displays 110 may be configured to provide a rendered display from the systems and methods of the present disclosure. In an exemplary embodiment, the rendered display from the systems and methods herein may be provided by a display at a terrestrial or ground station (e.g., a ground weather station or an aircraft dispatch location) or on a handheld device.

In some embodiments, the flight displays 110 may provide an output from the radar 112, aircraft-based weather radar system, LIDAR system, infrared system or other system on the aircraft. For example, the flight displays 110 may include a weather display, a multifunction display, a weather radar map and a terrain display. Further, the flight displays 110 may include an electronic display of a synthetic vision system (SVS). For example, the flight displays 110 may include a display configured to display a two-dimensional (2-D) image, a three dimensional (3-D) perspective image of terrain and/or weather information, or a four dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain above sea level or the altitude relative to the aircraft.

In some embodiments, an aircraft control center may include one or more user interface (UI) elements. The UI elements may include, for example, dials, switches, buttons, touch screens, keyboards, a mouse, joysticks, cursor control devices (CCDs) or other multi-function key pads certified for use with avionics systems, etc. The UI elements may be configured to, for example, allow an aircraft crew member to interact with various avionics applications and perform functions such as data entry, manipulation of navigation maps, and moving among and selecting checklist items. For example, the UI elements may be used to adjust features of the flight displays 110, such as contrast, brightness, width, and length. The UI elements may also (or alternatively) be used by an occupant to interface with or change the displays of the flight displays 110. The UI elements may additionally be used to acknowledge or dismiss an indicator provided by the flight displays 110. Further, the UI elements may be used to correct errors on the electronic display. Other UI elements, such as indicator lights, displays, display elements, and audio alerting devices, may be configured to warn of potentially threatening conditions such as severe weather, terrain, obstacles, etc.

The radar 112 may be configured to scan a surrounding environment of the aircraft 102 and alert a pilot of hazards (e.g., weather patterns or traffic) in the area near the aircraft 102. In some embodiments, the radar 112 is weather radar configured to detect weather patterns. In other embodiments, the radar 112 is a multi-use radar or multi-function radar that may detect other threats in addition to weather patterns (for example, air traffic). In some embodiments, the weather radar 112 may be substantially similar or substantially identical to the MultiScan™ Weather Radar manufactured by Rockwell Collins, Inc. (Cedar Rapids, IA).

The radar 112 may include one or more antennas, a receiver-transmitter (e.g., transceiver), a processor, a control panel, and a display. In some embodiments, the one or more antennas may comprise an array of antennas, such as an electronically scanned array (ESA). In some embodiments, each antenna in the array of antennas may instead comprise a sub-array (of two or more radiating elements).

The radar 112 may transmit radar pulses or beams and may receive radar return signals indicative of weather conditions. The radar 112 may have Doppler capabilities and may measure or detect parameters such as weather range, weather reflectivity, weather velocity, and weather spectral width or velocity variation. The radar 112 may also detect outside air temperature, winds at altitude, INS G loads (in-situ turbulence), barometric pressure, humidity, etc.

Radar signals generated by the radar 112 may be processed to provide graphical images to a weather display (e.g., one of the flight displays 110). The weather display 110 may be a color display providing graphical images in color to represent the severity of the weather. The weather display 110 may be configured to display weather data in two dimensions and may operate according to ARINC 453 and 708 standards. A horizontal plan view may provide an overview of weather patterns that may affect an aircraft mapped onto a horizontal plane. The horizontal plan view may provide images of weather conditions in the vicinity of the aircraft, such as indications of precipitation rates. Red, yellow, and green colors may be used to represent areas of respective precipitation rates, and black color may represent areas of very little or no precipitation. Each color may be associated with a radar reflectivity range which corresponds to a respective precipitation rate range. Red may indicate the highest rates of precipitation while green may represent the lowest (non-zero) rates of precipitation. Certain displays 110 may also utilize a magenta color to indicate regions of turbulence.

Information provided by the radar 112 may be used in conjunction with external weather data 107. The external weather data 107 may include weather information from other aircraft systems, ground-based systems, or satellite systems to improve range and accuracy and to reduce gaps in coverage of the radar 112. For example, the National Weather Service WSR-88D Next Generation Radar (NEXRAD) radar system may be used for detection and warning of severe weather conditions in the United States. NEXRAD data may be more complete than data from aircraft-based weather radar systems due to its use of volume scans of up to 14 different elevation angles with a one degree beam width. Similarly, the National Lightning Detection Network (NLDN) may be a reliable source of information for weather conditions exhibiting intense convection. Weather satellite systems, such as the Geostationary Operational Environmental Satellite system (GOES) and the Polar Operational Environmental Satellite system (POES) are other sources of data that may be used as external weather data 107.

In some embodiments, a weather imaging module may be executed by the processor(s) 106. The weather imaging module may be an organized set of instructions that, when executed, cause the processor 106 to utilize weather data from returns received by the radar 112 and/or from the external weather data 107 to provide individual, composite, fused, or overlay image data indicative of a weather pattern to present on the display 110. The image data derived from weather data generated by the radar 112 and the external weather data 107 may be spatially correlated by the weather imaging module using, for example, time of sensing information and motion vector values. In some embodiments, growth and decay information may be accessed, which may be used by the weather imaging module to increase or decrease the size, shape, and intensity of an image or other visual indication of a weather condition displayed in accordance with time. In some embodiments, the weather imaging module may determine a confidence factor reflecting the degree to which weather data accessed from two or more sources agree in their characterization of the weather pattern. In some embodiments, the weather imaging module may combine estimates of storm top height accessed from two or more sources of weather data to provide image data indicative of the vertical extent of a weather pattern. The weather imaging module is described in U.S. Pat. No. 10,302,815 which is incorporated herein by reference in its entirety.

In some embodiments, the radar 112 may be located inside a nose or cockpit of the aircraft 102. In some embodiments, the radar 112 may be located anywhere on the aircraft 102, such as on top of the aircraft 102 or on the tail of the aircraft 102. Further, the various components of the radar 112 may be distributed at multiple locations throughout aircraft 102. Additionally, the radar 112 may include or be coupled to an antenna system of the aircraft 102. The radar 112 or other equipment aboard the aircraft 102 may also be configured to receive or access the external weather data 107 from other sources (e.g., ground-based or satellite weather systems).

The radar 112 may generally work by sweeping or casting one or more radar beams horizontally back and forth across the sky. For example, the radar 112 may conduct a first horizontal sweep directly in front of the aircraft 102 and a second horizontal sweep downward at a tilt angle (e.g., a pitch or attitude adjustment 20 degrees down). Returns from different tilt angles may be electronically merged to form a composite image for display on the flight display 110. Returns may also be processed to, for example, distinguish among terrain, weather, and other objects, to determine the height of the terrain, or to determine the height of a weather pattern (e.g., an estimated or detected altitude).

The radar 112 may also sweep a radar beam vertically back and forth at varying vertical tilt angles (i.e., varying pitches or attitudes). Results from the different vertical tilt angles may be analyzed to determine the characteristics of weather. For example, the altitude, range, and vertical height of weather may be determined using the vertical scan results. The vertical scan results may be used to form an image for display on the flight display 110. For example, a vertical profile view of the weather may be generated. The profile may be used by a pilot to determine height, range, hazards and threats, and other relevant information that may be utilized by an aircraft crew member to change the course of the aircraft 102 to avoid the detected weather condition.

The processor(s) 106 may be included as part of a multi-scan, multi-tilt angle weather radar system and may perform the customary functions performed by a conventional weather radar return processing unit. In general, the processor(s) 106 may access data from various sources and integrate or combine them to generate convective weather observations and predictions in the form of data or weather threat level maps. The term "access," as used herein, is understood to mean any type of data receipt or acquisition. For example, processor(s) 106 may receive data pushed from other sources or may retrieve, poll, or pull data from a memory, a communications system, or from other sources. The processor(s) 106 may also merge or cross qualify portions, or ranges, of the radar returns of several different antenna sweeps at several different tilt angles, so that a single, relatively clutter-free image may be presented to the pilot based upon the several separate scans. The radar returns may be processed by the processor(s) 106 to generate a 2-D, 3-D, or 4-D weather profile of the weather near the aircraft 102 (e.g., within about a 100 mile radius of the aircraft 102). In some embodiments, the processor(s) 106 may merge or cross qualify portions, or ranges, of the radar returns or weather data of several different sources, including weather data from one or more remote sources via a terrestrial station or communications system, so that a composite or fused image may be presented to the pilot based upon the several weather data sources.

The processor(s) 106 may process weather radar returns to identify or sense the presence of weather conditions in front of (e.g., in the flight path), in view of, or in proximity to the aircraft 102. In some embodiments, the processor(s) 106 may utilize the altitude and range of the weather pattern to generate a vertical profile associated with the weather pattern. The processor(s) 106 may scan across an array of azimuths to generate a 3-D weather profile of the weather near the aircraft 102, which may be stored for later presentation and/or displayed on the display 110 or a display of a handheld device. In some embodiments, additional visual indicators other than the representation of weather are provided on the display 110 or a display of the handheld device. In some embodiments, a range and bearing matrix having range markers indicating distance from a current location of the aircraft 102 and bearing markers indicating azimuths from a current flight path or bearing of the aircraft 102 may be provided and may assist the pilot in cognitive recognition of weather features from the pilot's perspective.

Comparison modules 114 and 116 may be stored on the memory 108 and may be executed by the processor(s) 106. The module 114 may be configured to compare a flight trajectory of the aircraft 102 to a detected altitude (e.g., estimated altitude) of one or more detected weather patterns. The weather patterns may include clouds, fog, rain, snow, sleet, ice, storm cells, thunderstorms, tornados, cyclones, etc. The weather patterns may be detected using the weather data generated by the radar 112, and using the external weather data 107. The flight trajectory may be retrieved from an FMS computing device communicatively coupled to the aircraft computing device 104, or the aircraft computing device 104 may comprise an FMS computing device.

The module 116 may be configured to identify weather patterns as relevant or non-relevant. For example, if the detected altitude of a weather pattern is within a threshold distance in elevation (i.e., elevation radius) from the flight trajectory of the aircraft 102, the weather pattern may be identified as a relevant weather pattern. Otherwise, if the detected altitude of the weather pattern is outside a threshold distance in elevation from the flight trajectory, the weather pattern may be identified as a non-relevant weather pattern. The threshold distance in elevation may be of from 5 meters to 30,000 meters from the flight trajectory. The threshold distance in elevation may be configured to be, for example, 500 meters, 1000 meters, 5000 meters, etc. The detected altitude of a weather pattern may be defined as the top of the weather pattern (for example, the top of a storm cell) during a descent mode of the aircraft 102, or as the bottom of the weather pattern during the ascent mode of the aircraft. In some embodiments, the module 116 may save the identification of the weather patterns on the memory 108 (for example, in a weather pattern database), and may provide the identification of the weather patterns to other applications (for example, to present to passengers of the aircraft 102 using display devices at the passenger seats).

In some embodiments, the module 116 may identify weather patterns as relevant or non-relevant based on secondary metrics in addition to the threshold distance in elevation. For example, a weather pattern may be identified as relevant or non-relevant based on the aircraft 102 being within or outside a horizontal threshold distance to the weather pattern at points along the flight trajectory.

A module 118 may be stored on the memory 108 and may be executed by the processor(s) 106. The module 118 may be configured to present symbols corresponding to the relevant weather patterns on the weather display 110 and exclude symbols corresponding to the non-relevant weather patterns on the weather display 110 (based on the comparison performed by the modules 114 and 116). The module 118 may instruct the flight display 110 using sets of aircraft display hardware directives (e.g., 32 bit opcodes).

Figure 2A:
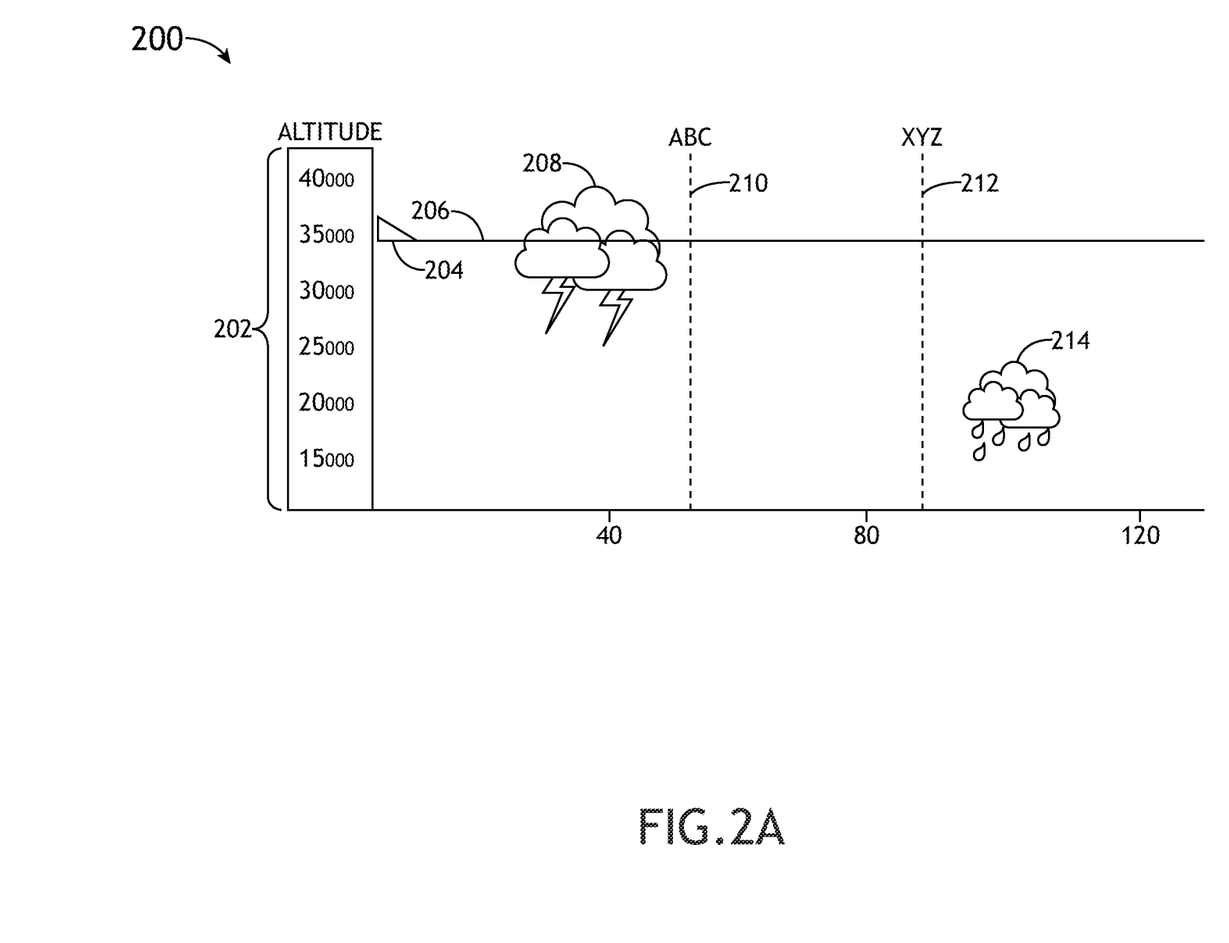
Figure 2B:
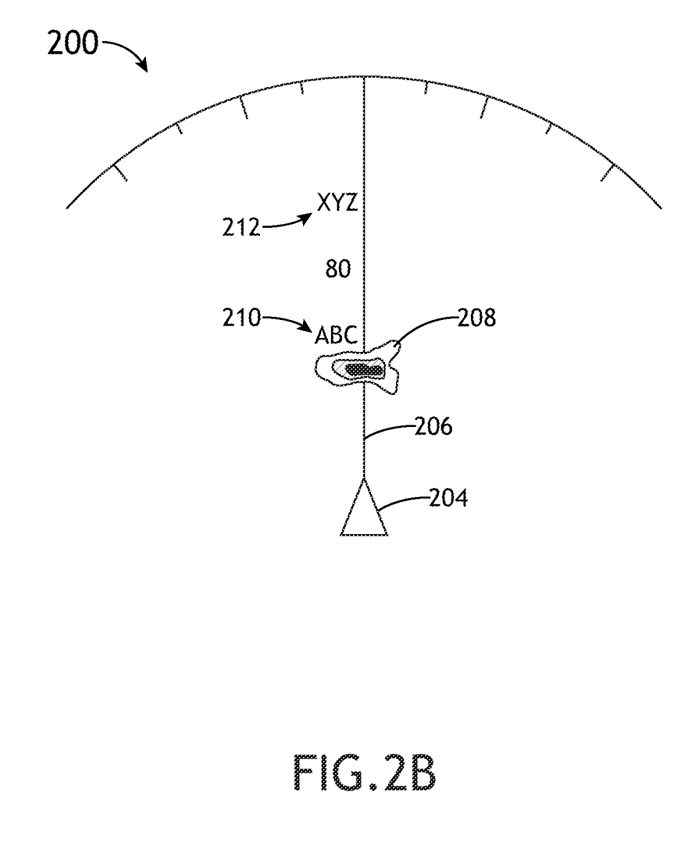

FIGS. 2A-2B are conceptual images illustrating a presentation 200 on the flight display 110, in accordance with one or more embodiments of the present disclosure. FIG. 2A shows a horizontal flight plan view and FIG. 2B shows a top-down flight plan view.

The weather pattern symbols 208 and 214 may represent the locations of weather patterns detected using the radar 112 and the external weather data 117. The aircraft symbol 204 may represent the location of the aircraft 102. The weather pattern symbols 208 and 214 may be overlaid on a flight trajectory 206 of the aircraft 102 retrieved from a flight management system (i.e., from a FMS computing device).

The presentation 200 may display symbols at a plurality of altitudes 202. As shown, the aircraft symbol 204 is displayed at an altitude of about 35,000 feet, the weather pattern symbol 208 is displayed at an altitude of about 35,000 feet (at location 210 labeled "ABC"), and the weather pattern symbol 214 is displayed at an altitude of about 20,000 feet (at location 212 labeled "XYZ").

The weather pattern represented by symbol 208 may be identified as a relevant weather pattern and the weather pattern represented by symbol 214 may be identified as a non-relevant weather pattern (by the comparison modules 114 and 116). Although both weather pattern symbols 208 and 214 are shown in FIG. 2A, the module 118 may present the relevant weather pattern symbol 208 on the weather display 110 and exclude the non-relevant weather pattern symbol 214 on the weather display 110. For example, in FIG. 2B, the non-relevant weather pattern symbol 214 is hidden from view (since the weather pattern corresponding to symbol 214 is outside a threshold distance in elevation from the flight trajectory 206).

In some embodiments, the non-relevant weather pattern symbol 214 may be excluded from display during a cruising mode of flight. During the cruising mode of flight, the flight trajectory 206 may be displayed without any changes in elevation. Although the aircraft is shown as cruising at an altitude of 35,000 feet in FIGS. 2A and 2B, the aircraft may cruise at different altitudes (for example, 25,000 feet).

Figure 3A:
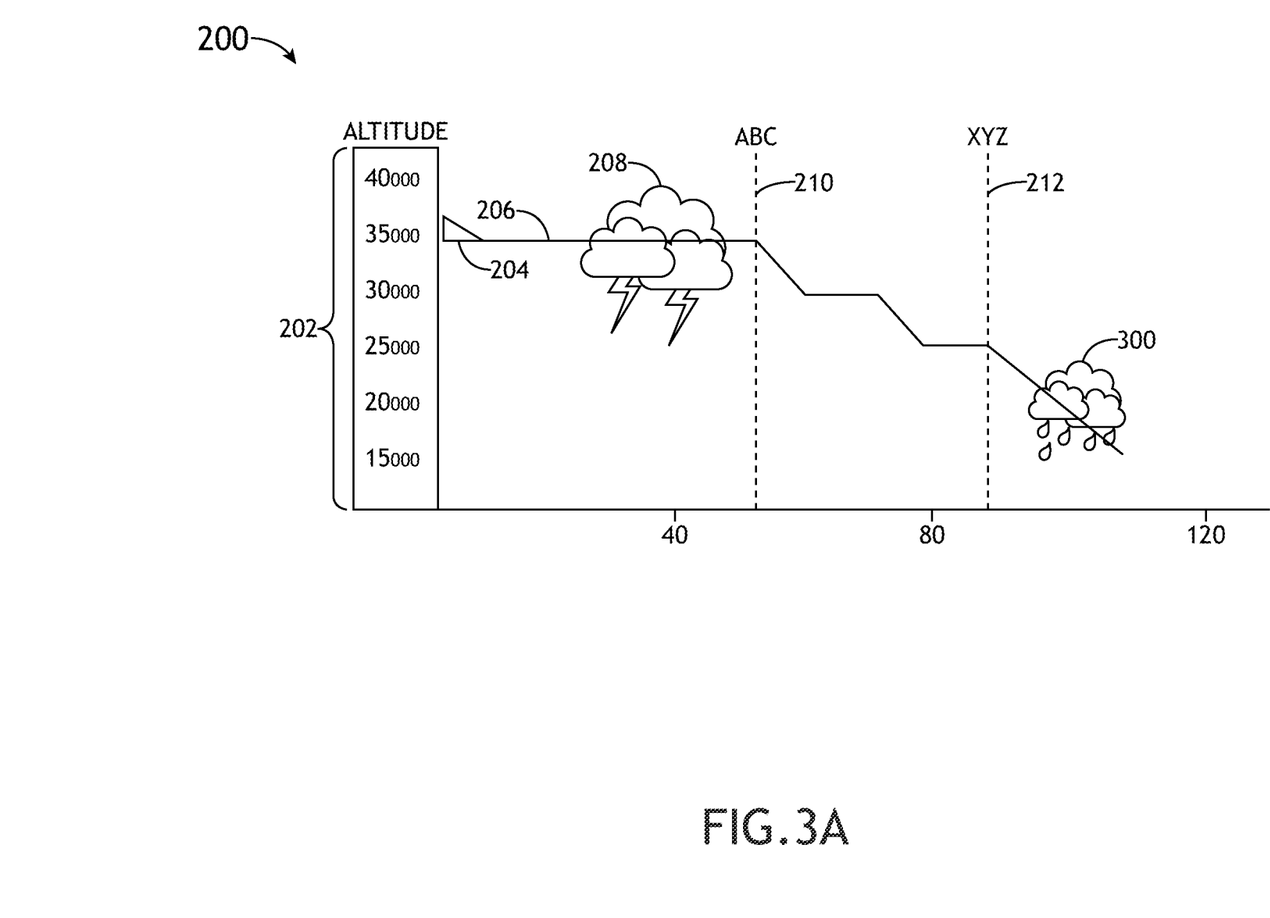
Figure 3B:
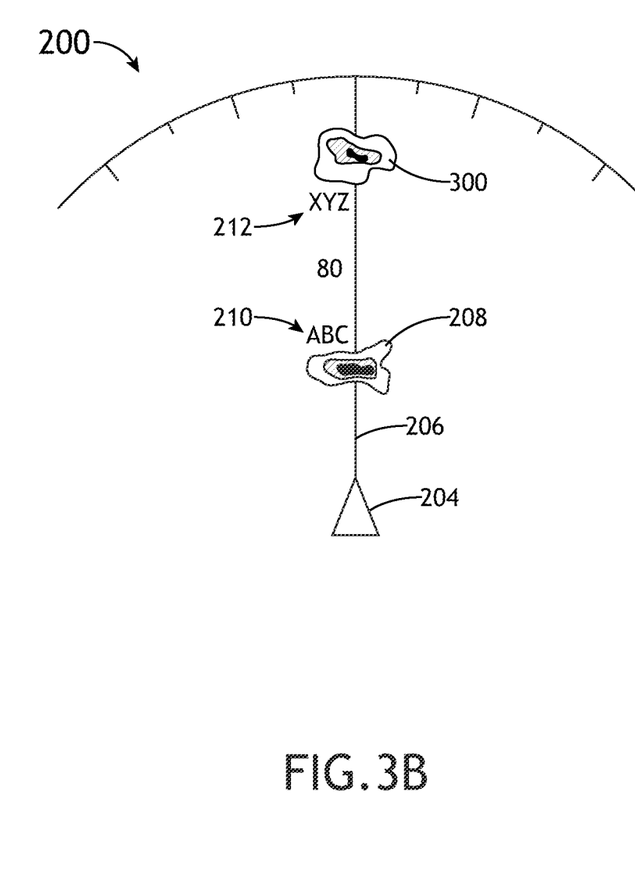

FIGS. 3A-3B are conceptual images illustrating the presentation 200 on the flight display 110, in accordance with one or more embodiments of the present disclosure.

As shown in FIGS. 3A-3B, the aircraft converts to a descent mode of flight. The non-relevant weather pattern (represented by symbol 214 in FIGS. 2A-2B) is within a threshold distance of the flight trajectory, and consequently, is now identified as a relevant weather pattern (represented by symbol 300 in FIGS. 3A-3B). In this way, the pilot may be alerted to a hazard significantly ahead of time (e.g. before a descent or an ascent of the aircraft 102), and the aircraft may avoid sudden or dangerous evasive maneuvers. In some embodiments, the module 118 may present the relevant weather pattern symbols during a holding pattern mode of flight.

Referring back to FIG. 1, the module 120 may be stored on the memory 108 and may be executed by the processor(s) 106. The module 120 may be configured to adjust the weather radar 112 to improve the detection of relevant weather patterns.

In some embodiments, the module 120 may control (i.e., adjust) a vertical tilt angle (e.g., attitude or pitch) of one or more antennas of the radar 112 to improve the detection the relevant weather patterns. For example, the one or antennas may be controlled to point downward (e.g., toward the surface of the Earth) to detect low-lying weather (several thousand meters below the aircraft 102).

In some embodiments, one or more antennas of the weather radar 112 may utilize two or more beams to detect the one or more weather patterns. In response to the identification of the relevant weather patterns, the module 120 may instruct the one or more antennas of the radar 112 to utilize one or more auxiliary beams to improve detection of the relevant weather patterns (e.g., in addition to the two or more beams).

In some embodiments, the one or more antennas of the weather radar 112 comprise an electronically scanned array (ESA). In response to the identification of the relevant weather patterns, the module 120 may instruct the ESA to utilize a beam sharpening mode to detect the relevant weather patterns. The beam sharpening mode may utilize a monopulse technique. Techniques for beam sharpening and determining beam sharpening angles and directions of radar objects are discussed in U.S. patent application Ser. Nos. 13/627,788, 12/892,563, 13/250,798, 12/236,464, and 12/167,200 and U.S. Pat. No. 8,077,078, which are incorporated herein by reference in their entirety. In some embodiments, the beam sharpening mode may utilize other techniques such as a split aperture technique or a conical scan technique.

Figure 4:
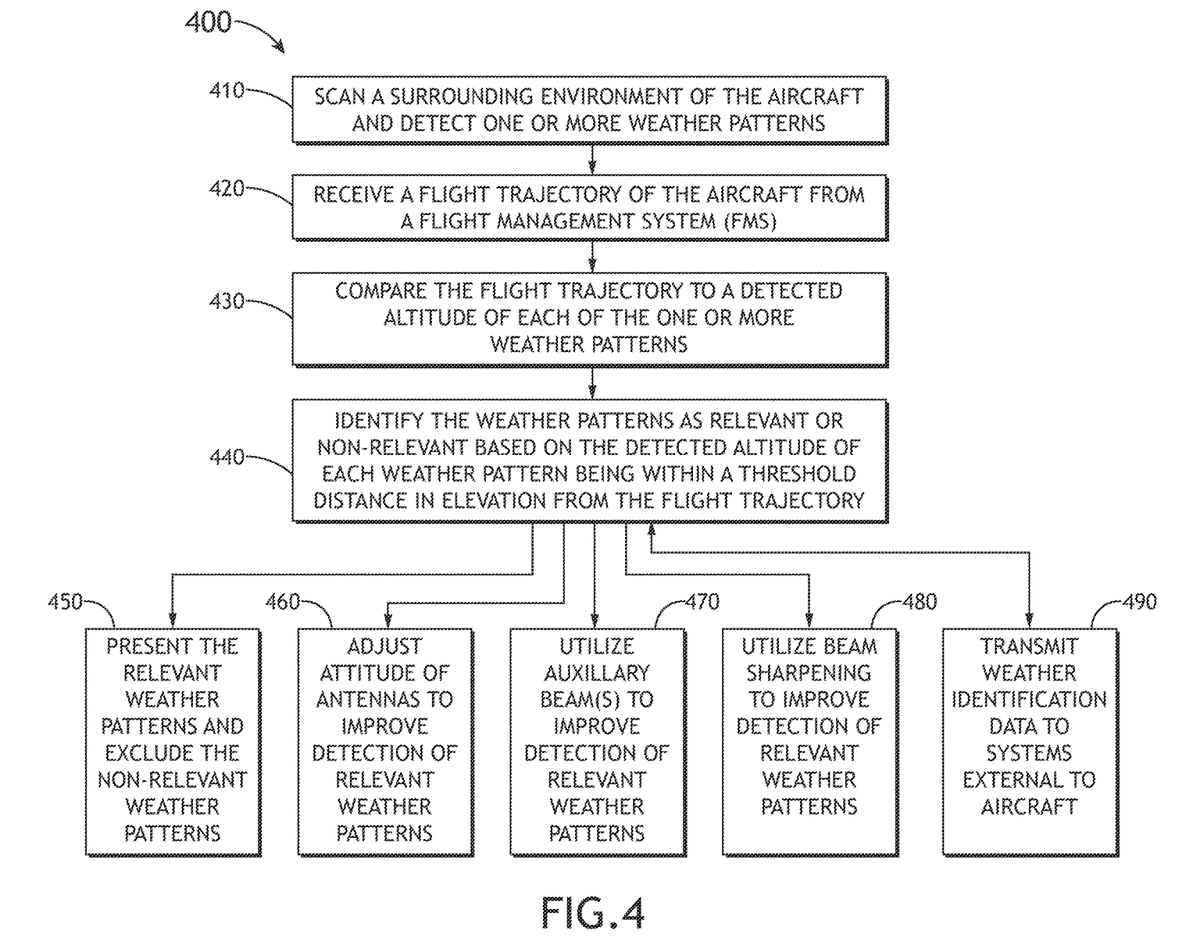
FIG. 4 is a flow chart illustrating a weather depiction method for an aircraft, in accordance with one or more embodiments of the present disclosure.

FIG. 4 is a flow chart 400 illustrating an aircraft weather depiction method, in accordance with one or more embodiments of the present disclosure.

At step 410, a weather radar scans a surrounding environment of an aircraft and provides weather data. One or more weather patterns may be detected using the weather data (which may be correlated with external weather data). Each of the one or more weather patterns is detected at a respective altitude and/or lateral distance to the flight trajectory (i.e., the altitude and lateral distance of each weather pattern may be detected, measured, and/or estimated, and recorded in a database). Additionally, the azimuth of each weather pattern may be detected, measured, and/or estimated, and recorded in a database At step 420, a flight trajectory of the aircraft is received from a flight management system (FMS). The aircraft computing device may comprise the FMS or be communicatively coupled to the FMS.

At step 430, the flight trajectory is compared to the detected altitude of each of the one or more weather patterns.

At step 440, in response to the detected altitude being within a threshold distance in elevation from the flight trajectory, the respective weather pattern is identified as a relevant weather pattern. Otherwise, in response to the detected altitude being outside a threshold distance in elevation from the flight trajectory, the weather pattern is identified as one of a plurality of non-relevant weather patterns.

At step 450, symbols corresponding to the relevant weather patterns are presented on a weather display and symbols corresponding to the non-relevant weather patterns are excluded on the weather display.

At step 460, a vertical tilt angle of one or more antennas of the weather radar is adjusted to improve the detection the relevant weather patterns.

At step 470, the one or more antennas of the weather radar utilize one or more auxiliary beams to improve detection of the relevant weather patterns.

At step 480, the one or more antennas of the weather radar comprise an electronically scanned array (ESA), and, in response to the identification of the relevant weather patterns, the ESA utilizes a beam sharpening mode to improve detection of the relevant weather patterns. The beam sharpening mode utilizes a monopulse technique.

At step 490, weather identification data (related to the identification of relevant weather patterns and non-relevant patterns) is transmitted to systems external to the aircraft. For example, the weather identification data may be transmitted to an autonomous system (e.g., drone or unmanned aerial vehicle) for use in navigation and threat identification. In some embodiments, the weather identification data may be transmitted to other aircraft (for example, other aircraft flying the same route), and may also be received from other aircraft. In this way, weather identification data may be shared among a plurality of aircraft as part of a connected solution (e.g., weather network).

It is noted that the steps 460, 470, 480, and 490 may be performed alternatively or additionally. In some embodiments, all of the steps 460, 470, 480 and 490 may be performed together.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A weather depiction system for an aircraft, comprising:
   a radar configured to scan a surrounding environment of the aircraft and provide weather data; and
   an aircraft computing device including one or more processors configured to execute program instructions causing the one or more processors to:
   detect a plurality of weather patterns using the weather data, wherein each of the weather patterns is detected at a detected altitude, and wherein the detected altitude is defined as a top of each of the weather patterns during a descent mode of the aircraft, or as a bottom of each of the weather patterns during an ascent mode of the aircraft;
   receive a flight trajectory of the aircraft from a flight management system (FMS);
   for each of the weather patterns;
   responsive to the detected altitude of a weather pattern being within a threshold distance in elevation from the flight trajectory, identify the weather pattern as one of a plurality of relevant weather patterns; and
   responsive to the detected altitude of the weather pattern being outside the threshold distance in elevation from the flight trajectory, identify the weather pattern as one of a plurality of non-relevant weather patterns; and
   present symbols corresponding to the plurality of relevant weather patterns on a top-down flight plan view of a weather display, wherein the symbols comprise weather radar patterns comprising graphical images in colors corresponding to a severity of the weather,
   exclude symbols corresponding to the plurality of non-relevant weather patterns from the weather display responsive to the aircraft being in a cruising mode.

2. The weather depiction system of claim 1, wherein the symbols corresponding to the plurality of relevant weather patterns are presented on the weather display responsive to the aircraft being in the ascent mode or the descent mode.

3. The weather depiction system of claim 1, wherein, responsive to the identification of the relevant weather patterns, a vertical tilt angle of one or more antennas of the radar is adjusted to improve the detection the relevant weather patterns.

4. The weather depiction system of claim 1, wherein one or more antennas of the radar utilize two or more beams to detect the weather patterns.

5. The weather depiction system of claim 4, wherein, responsive to the identification of the relevant weather patterns, the one or more antennas of the radar utilize one or more auxiliary beams to improve detection of the relevant weather patterns in addition to the two or more beams.

6. The weather depiction system of claim 1, wherein one or more antennas of the radar comprise an electronically scanned array (ESA).

7. The weather depiction system of claim 6, responsive to the identification of the relevant weather patterns, the ESA utilizes a beam sharpening mode to detect the relevant weather patterns, wherein the beam sharpening mode utilizes at least one of a monopulse technique, a split aperture technique, or a conical scan technique.

8. The weather depiction system of claim 1, wherein the weather data includes external weather data provided by at least one of a ground-based weather system or a satellite based system.

9. A weather depiction method for an aircraft, comprising:
   scanning, using a radar, a surrounding environment of the aircraft and providing weather data;
   detecting a plurality of weather patterns using the weather data, wherein each of the weather patterns is detected at a detected altitude, and wherein the detected altitude is defined as a top of each of the weather patterns during a descent mode of the aircraft, or as a bottom of each of the weather patterns during an ascent mode of the aircraft;
   using an aircraft computing device, receiving a flight trajectory of the aircraft from a flight management system (FMS);
   for each of the weather patterns:
   responsive to the detected altitude of a weather pattern being within a threshold distance in elevation from the flight trajectory, identifying the weather pattern as one of a plurality of relevant weather patterns; and
   responsive to the detected altitude of the weather pattern being outside the threshold distance in elevation from the flight trajectory, identifying the weather pattern as one of a plurality of non-relevant weather patterns;
   presenting symbols corresponding to the relevant weather patterns on a top-down flight plan view of a weather display, wherein the symbols comprise weather radar patterns comprising graphical images in colors corresponding to a severity of the weather; and
   exclude symbols corresponding to the plurality of non-relevant weather patterns from the weather display responsive to the aircraft being in a cruising mode.

10. The weather depiction method of claim 9, wherein the symbols corresponding to the plurality of relevant weather patterns are presented on the weather display responsive to the aircraft being in an ascent mode or a descent mode.

11. The weather depiction method of claim 9, wherein, responsive to the identification of the relevant weather patterns, a vertical tilt angle of one or more antennas of the radar is adjusted to improve the detection the relevant weather patterns.

12. The weather depiction method of claim 9, wherein one or more antennas of the radar utilize two or more beams to detect the weather patterns.

13. The weather depiction method of claim 12, wherein, responsive to the identification of the relevant weather patterns, the one or more antennas of the radar utilize one or more auxiliary beams to improve detection of the relevant weather patterns in addition to the two or more beams.

14. The weather depiction method of claim 9, wherein one or more antennas of the weather radar comprise an electronically scanned array (ESA), and, responsive to the identification of the relevant weather patterns, the ESA utilizes a beam sharpening mode to improve detection of the relevant weather patterns, wherein the beam sharpening mode utilizes at least one of a monopulse technique, a split aperture technique, or a conical scan technique.

15. The weather depiction method of claim 9, wherein the weather data includes external weather data provided by at least one of a ground-based weather system or a satellite based weather system.

* * * * *